United States Patent [19]
Husain et al.

[11] Patent Number: 5,509,305
[45] Date of Patent: Apr. 23, 1996

[54] CLOSELY COUPLED, DUAL TURBINE VOLUMETRIC FLOW METER

[75] Inventors: Zaki D. Husain; Helmet Zenger; F. Dale Goodson; Donald J. Wass, all of Houston, Tex.

[73] Assignee: Daniel Industries, Inc., Houston, Tex.

[21] Appl. No.: 396,579

[22] Filed: Mar. 1, 1995

Related U.S. Application Data

[63] Continuation of Ser. No. 106,365, Aug. 13, 1993, abandoned, which is a continuation-in-part of Ser. No. 84,510, Jun. 29, 1993, abandoned, which is a continuation-in-part of Ser. No. 834,601, Feb. 12, 1992, Pat. No. 5,325,729.

[51] Int. Cl.$^6$ ................. G01F 7/00; G01F 1/12
[52] U.S. Cl. ..................... 73/195; 73/861.84
[58] Field of Search .......... 73/195, 196, 861.84

[56] References Cited

U.S. PATENT DOCUMENTS

| | | | |
|---|---|---|---|
| 2,943,487 | 7/1960 | Potter | 73/231 |
| 3,043,140 | 7/1962 | Waugh et al. | 73/194 |
| 3,135,116 | 6/1964 | Kwong et al. | 73/861.91 |
| 3,142,179 | 7/1964 | Souriau | 73/231 |
| 3,144,769 | 8/1964 | Francisco, Jr. | 73/231 |
| 3,177,712 | 4/1965 | Brooking | 73/231 |
| 3,201,987 | 8/1965 | Ackerman | 73/861.79 |
| 3,301,053 | 1/1967 | Walch, Jr. et al. | |
| 3,498,129 | 3/1970 | Bodge | 73/231 |
| 3,686,948 | 8/1972 | Lahaye | 73/230 |
| 3,710,622 | 1/1973 | Hammond et al. | 73/861.84 |
| 3,934,473 | 1/1976 | Griffo | 73/861.84 |
| 3,979,957 | 9/1976 | Rutgerson et al. | 73/231 |
| 3,999,432 | 12/1976 | Coninx et al. | 73/231 |
| 4,086,811 | 5/1978 | Penet | 73/861.84 |
| 4,091,653 | 5/1978 | Lee | 73/3 |
| 4,168,624 | 9/1979 | Pichon | 73/195 |
| 4,184,364 | 1/1980 | Du Bae | 73/54 |
| 4,286,471 | 9/1981 | Lee et al. | 73/861.84 |
| 5,099,697 | 3/1992 | Agar | 73/861.04 |
| 5,325,729 | 7/1994 | Goodson et al. | 73/861.91 |

FOREIGN PATENT DOCUMENTS 978664 12/1964 United Kingdom.

*Primary Examiner*—Richard Chilcot
*Assistant Examiner*—William L. Oen
*Attorney, Agent, or Firm*—Fish & Richardson

[57] ABSTRACT

A meter is provided for measuring the volumetric flow of a fluid in a conduit. The meter comprises a pair of turbine assemblies. Each of the turbine assemblies are adapted to have a speed of rotation representative of a volumetric fluid flow that is independent of the other turbine assembly. A flow randomizer is located between the pair of turbine assemblies. The flow randomizer is operable to eliminate substantially all flow effects of one of the turbine assemblies upon the other turbine assembly. Means are provided for transducing the speed of rotation of at least one of the turbine assemblies.

29 Claims, 5 Drawing Sheets

CLOSELY COUPLED, DUAL TURBINE VOLUMETRIC FLOW METER

CROSS REFERENCE TO RELATED APPLICATIONS

This is a continuation of application Ser. No. 08/106,365, filed Aug. 13, 1993, now abandoned, which is a continuation-in-part of U.S. patent application Ser. No. 08/084,510, filed Jun. 29, 1993, now abandoned, which is a continuation-in-part of U.S. patent application Ser. No. 834,601, filed Feb. 12, 1992, now U.S. Pat. No. 5,325,729.

BACKGROUND OF THE INVENTION

1. Field of the Invention

The present invention relates generally to volumetric flow measurement devices, and more specifically relates to a closely coupled, dual turbine volumetric flow measurement device.

2. Description of the Related Art

It is common in the industry to measure the flow of fluids in a conduit by measurement devices that are integral with the conduit. For example, it is common to use orifice plate flow meters, mass turbine flow meters, or volumetric turbine flow meters in line with the conduit or pipeline transporting the fluid.

In recent years, the flow measurement industry has become increasingly concerned with the accuracy of flow measurement, with the predictability of flow meter failure, and with the redundancy or "fail safe" quality of flow measurement. Several attempts have been made by those of skill in the industry to address these issues.

For example, U.S. Pat. No. 3,210,987 to A. C. Ackerman issued on Aug. 24, 1965, and is directed to a mass flow meter. The Ackerman patent discloses a flow meter that employs two turbines. The first turbine is a free running turbine that is operated by the fluid to be measured. The fluid then passes through a flow decoupling device before reaching the second turbine. The second turbine is loaded in such a manner that the power generated by it is a known function of its speed. The flow decoupling device is disclosed to comprise a plurality of high solidity vanes that are mounted in the inlet section to remove swirl from the flow, dampen large scale turbulence, and minimize flow distortions.

U.S. Pat. No. 3,710,622 to Hammond et al. is directed to a viscosity compensated dual rotor turbine flow meter and issued on Jan. 16, 1973. The Hammond patent discloses a dual turbine flow meter that uses an intermediate vane assembly as a spacer between the two turbines and as a fluid flow turbulence reducer. The intermediate vane assembly between the two turbines is disclosed to substantially reduce the interaction that might otherwise exist between the rotor assemblies.

U.S. Pat. No. 4,305,281 to Lee et at. is directed to a self-correcting, self-checking turbine meter and issued on Dec. 15, 1981. The Lee et al. patent discloses a turbine meter that utilizes two turbines. The upstream turbine is disclosed to be the metering rotor and the downstream turbine is disclosed to be a sensing rotor which senses changes in the exit angle of the fluid leaving the metering turbine.

These prior attempts to improve the flow measurement of fluids by utilizing dual turbines has not been entirely successful. For example, prior art dual turbine flow meters often require large physical spacing between the turbines. This results in flow meters that occupy an undesirably long length of conduit or pipeline. Some flow meter installations, such as in Europe, require that the flow meter length be three times the nominal diameter of the conduit or less.

Also, prior art dual turbine flow meters typically are not capable of providing flow measurement if one of the turbines fail. In other words, the turbines of prior art dual turbine flow meters are not independent.

Additionally, prior art dual turbine flow meters are complex and often require substantial post-transduction solution to provide usable flow information.

The present invention is directed to an improved dual turbine flow meter which overcomes or minimizes these and other limitations of prior art devices.

SUMMARY OF THE INVENTION

In one aspect of the present invention, a meter is provided for measuring the volumetric flow of a fluid in a conduit. The meter comprises a pair of turbine assemblies. Each of the turbine assemblies is adapted to have a speed of rotation representative of a volumetric fluid flow that is independent of the other turbine assembly. A flow randomizer is located between the pair of turbine assemblies. The flow randomizer is operable to eliminate substantially all flow effects of one of the turbine assemblies upon the other turbine assembly. Means are provided for transducing the speed of rotation of at least one of the turbine assemblies.

In another aspect of the present invention, a volumetric fluid flow meter is provided, which comprises a first bi-directional, substantially non-magnetic turbine assembly. The first turbine assembly has a vane assembly and a turbine that has a plurality of substantially magnetic rotors. The turbine of the first turbine assembly is adapted to rotate at speeds representative of differing rates of fluid flow past the first turbine assembly. A second bi-directional, substantially non-magnetic turbine assembly is provided. The second turbine assembly has a vane assembly and a turbine that has a plurality of substantially magnetic rotors. The turbine of the second turbine assembly is adapted to rotate at speeds representative of differing rates of fluid flow past the second turbine assembly. A flow randomizer is located between the first bi-directional turbine assembly and the second bi-directional turbine assembly. The flow randomizer comprises a plurality of vanes of sufficient length to eliminate substantially all flow effects of one of the turbine assemblies upon the other turbine assembly. A first magnetic pickup located adjacent the magnetic rotors of the first turbine assembly for transducing the speed of rotation of the first turbine is provided. A second magnetic pickup located adjacent the magnetic rotors of the second turbine assembly for transducing the speed of rotation of said second turbine is also provided.

Still another aspect of the present invention provides a method for measuring the volumetric flow rate of a fluid in a conduit. The method comprises the steps of flowing the fluid through a flow meter of a length approximately equal to or less than three times the nominal diameter of the conduit. The flow meter comprises a first bi-directional, independent turbine flow meter and a second bi-directional, independent turbine flow meter separated by a flow randomizer optimized for causing small scale turbulence in the fluid; decreasing flow effects in the fluid caused by said first turbine meter; measuring a speed of rotation of the first independent turbine meter; and measuring a speed of rotation of the second independent turbine meter.

BRIEF DESCRIPTION OF THE DRAWINGS

Other objects and advantages of the invention will become apparent upon reading the following detailed description with reference to the drawings in which.

DESCRIPTION OF THE PREFERRED EMBODIMENT

Figure 1:
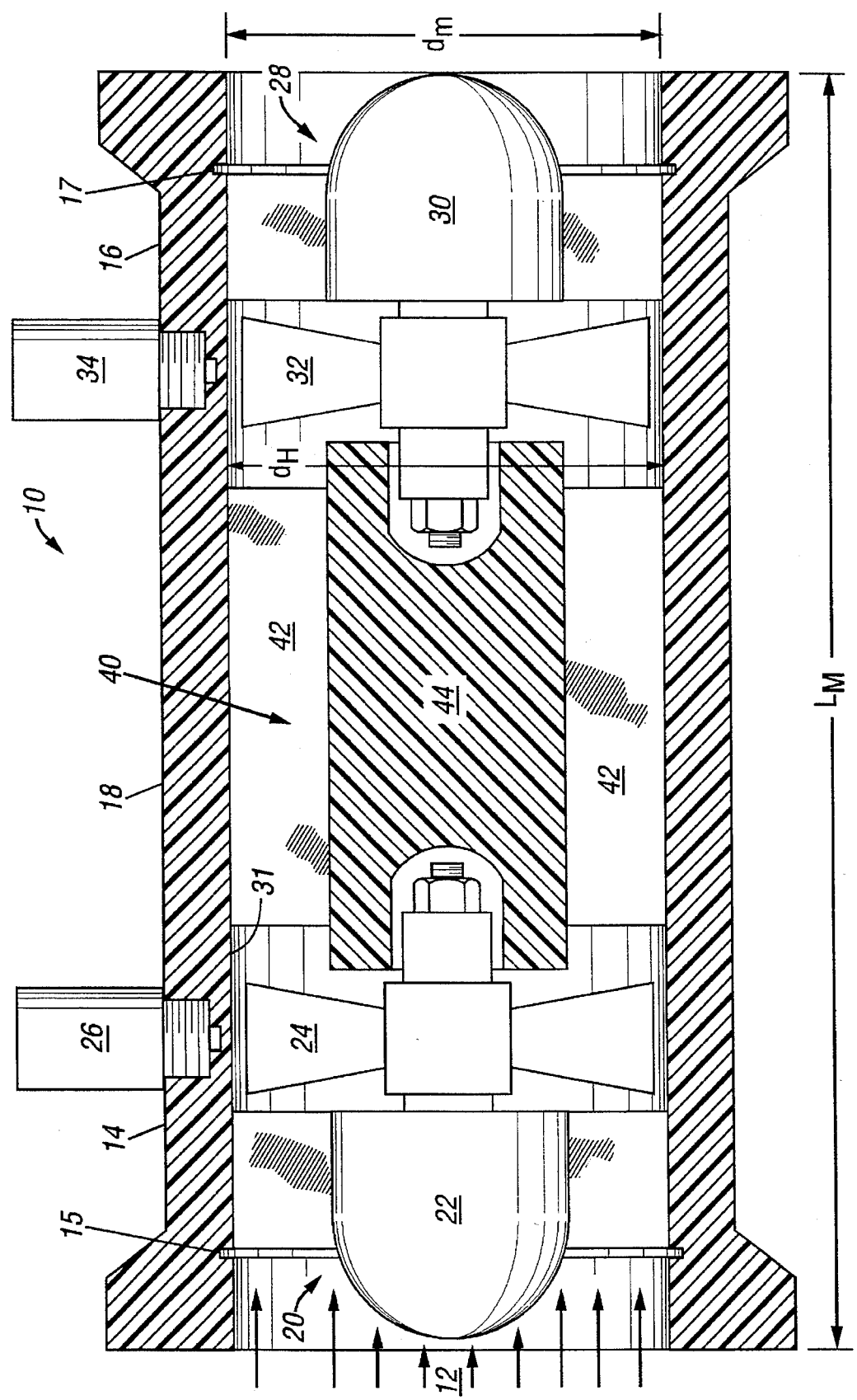
FIG. 1 illustrates a partial longitudinal cross-sectional view of a dual turbine meter made according to the present invention.

A preferred embodiment of the present invention is shown in FIG. 1. A closely coupled, dual turbine volumetric flow meter 10 is shown in partial cross-section in FIG. 1. The flow meter preferably is a bi-directional flow meter and therefore can accurately measure fluid flow from either direction. The following description of the apparatus of the present invention, however, will be based upon uni-directional fluid flow as depicted in FIG. 1 by the numeral 12. References to "upstream" and "downstream" will assume a left-to-right fluid flow as depicted in FIG. 1. It should be noted that those references to "upstream" and "downstream" must be reversed for right-to-left fluid flow.

The flow meter 10 has an upstream turbine section 14, a downstream turbine section 16, and an intermediate section 18. The upstream turbine section 14 houses an upstream turbine assembly 20. The upstream turbine assembly 20 is comprised of an upstream vane/diffuser assembly 22 and an upstream rotor assembly 24. In the preferred embodiment depicted in FIG. 1, the upstream turbine assembly 20 is of the cantilever type. Upstream turbine assembly 20 is held in position by a snap ring (not shown) that engages upstream groove 15.

The upstream turbine section 14 also contains an upstream turbine pickup 26. In the preferred embodiment depicted in FIG. 1, the upstream turbine pickup 26 is a conventional magnetic pickup capable of transducing or detecting rotation of the upstream rotor assembly 24. Preferably, the upstream turbine section 14 and the upstream vane/diffuser assembly 22 are fabricated from non-magnetic, or paramagnetic materials. Conversely, the blades of the upstream rotor assembly 24 are fabricated from a magnetic or ferromagnetic material. Rotation of the upstream rotor assembly 24 past the upstream turbine pickup 26 will induce an electrical signal in the upstream turbine pickup 26. For the present invention, the upstream turbine section 14 and the upstream vane/diffuser assembly 22 can be manufactured from substantially non-magnetic materials and the blade of the upstream rotor assembly 24 from substantially magnetic materials. It will be appreciated that the magnetic properties of the materials used can vary so long as the detection of angular velocity of the rotor assembly 24 by turbine pickup 26 is sufficient for flow meter purposes.

The upstream turbine pickup 26 of the preferred embodiment relies upon magnetic inductance to generate a signal that is indicative of or related to the volume of fluid flowing past the upstream rotor assembly 24. There are other suitable techniques for detecting rotation of the upstream rotor assembly 24 to determine the volume of fluid flowing past the upstream rotor assembly 24. For example, a mechanical linkage, common in many prior art turbine meters, is suitable for use with the present invention assuming that a suitable level of accuracy and repeatability can be achieved. Also, infrared sensors are available for detecting rotation of rotor assembly 24. It will be appreciated that multiple turbine pickups can be used for each turbine assembly. For example, the upstream turbine housing 14 can have two magnetic turbine pickups 26 and 26' (not shown). For a twelve (12) blade rotor assembly, a 97½° physical offset between multiple turbine pickups will produce a 90° electrical phase difference between the turbine pickup signals. It will be appreciated that typically turbine pickup 26 is positioned such that the centerline of the turbine pickup substantially coincides with the centerline of the blades of rotor assembly 24, as shown in FIG. 1. It has been found, for a twelve (12) blade rotor assembly, that a 90° electrical phase difference between two turbine pickups (e.g., 26 and 26') also can be achieved with a 90° physical offset (instead of a 97½° physical offset) by displacing one of the turbine pickups from the centerline of the blades to a position near the blade tip. Various electrical phase differences between multiple turbine pickup signals can be achieved by adjusting the physical location of the turbine pickups, with respect to each other and/or with respect to the blades of the rotor assemblies.

Also shown in FIG. 1 is a downstream turbine assembly 28 located within the downstream turbine section 16. The downstream turbine assembly 28 comprises a downstream vane/diffuser assembly 30 and a downstream rotor assembly 32. Also shown is a downstream turbine pickup 34. The disclosure above with respect to the upstream turbine assembly 20, the upstream groove 15 and the upstream turbine pickup 26 also pertains to the downstream turbine assembly 28, the downstream groove 17, and the downstream turbine pickup 34.

The upstream turbine assembly 20 and the downstream turbine assembly 28 do not have to be of identical type. For example, the upstream turbine assembly 20 can be of the cantilever type, and the downstream turbine assembly can be of a different type, e.g., non-cantilever. Moreover, the upstream turbine pickup 26 may be of the magnetic inductance type whereas the downstream turbine pickup 34 may be of the mechanical linkage or infrared type. In the preferred embodiment shown in FIG. I, both the upstream turbine assembly 20 and the downstream turbine assembly 28 are cantilever turbine meters, and the upstream turbine pickup 26 and the downstream turbine pickup 34 are of the magnetic inductance type.

Also shown in FIG. 1 is the intermediate section 18. In this preferred embodiment, the intermediate section 18 has an inside diameter $d_H$ that is substantially identical to the nominal inside diameter $d_m$, of the upstream turbine section 14 and the downstream turbine section 16. The intermediate section 18 is shown in FIG. 1 to be integral with the upstream turbine section 14 and with the downstream turbine section 16. Alternatively, the intermediate section 18 may be a discrete section coupled to the upstream section 14 and the downstream section 16 by suitable means. For example, bolted flanges can be utilized between the upstream and downstream turbine sections and the intermediate section. Threaded connections can also be used. Whatever method of coupling is chosen, it will be appreciated that serviceability of the flow meter components should not be compromised by the selection of coupling. Also, as will be developed more fully below, positioning of the flow randomizer 40 should not be inhibited.

Intermediate the upstream section 14 and the downstream turbine section 16, and within the cylindrical region formed by the inside diameter surface 31 of the intermediate section 18 is a flow randomizer 40. In the preferred embodiment of FIG. 1, the flow randomizer 40 comprises a plurality of randomizing vanes 42 projecting radially from a central diffuser 44.

In the present invention, the flow randomizer 40 is constructed and positioned to randomize the flow 12 exiting the upstream turbine assembly 20 by increasing the small scale turbulence of the fluid flow 12. This increase in the small scale turbulence of the fluid flow 12 randomizes the fluid flow and reduces or masks flow effects created by the upstream turbine assembly 20 relative to the downstream turbine assembly 28.

As shown in FIG. 1, the closely coupled, dual turbine flow meter of the present invention has an overall length of $L_m$. In a preferred embodiment of the present invention, the overall length $L_m$ is related to the internal diameter $d_m$ of the flow meter 10 in terms of a preselected ratio. More particularly, the overall length $L_m$ of the flow meter 10 is preferably $3d_m$. Overall length $L_m$ can be greater than $3d_m$, but, more importantly, optimizing the flow randomizer 40 can decrease the overall length $L_m$ to less than $3d_m$.

Figure 2:
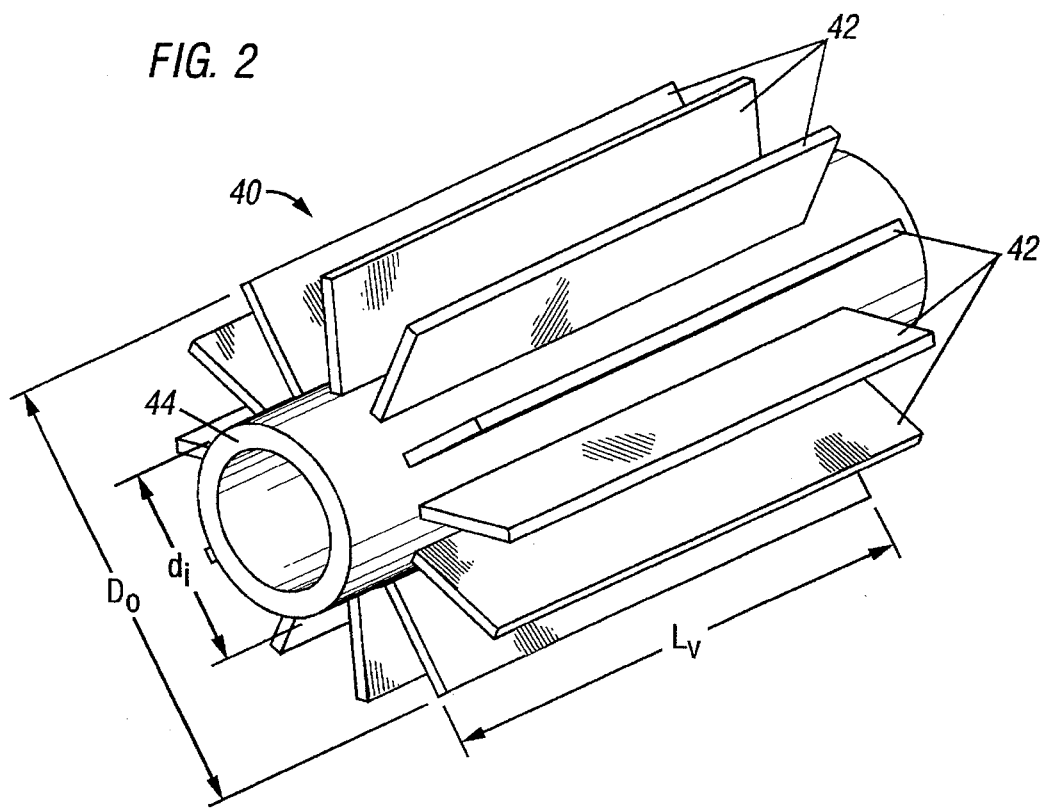
FIG. 2 illustrates a preferred embodiment of a flow randomizer of the present invention.

As shown in FIG. 2, a preferred embodiment of the flow randomizer 40 has an outer diameter $D_o$, a central diffuser 44 diameter $d_i$, and a vane length $L_v$. Typically, the vane length $L_v$ will be equal to or greater than half the internal diameter $d_m$ of the flow meter 10 (i.e., $L_v \geq d_m/2$). For a preferred embodiment, the vane length $L_v$ is greater than or equal to $0.75d_m$ and less than or equal to $d_m$ (i.e., $3d_m/4 \leq L_v \leq d_m$). For flow randomizers similar to the preferred embodiment disclosed in FIG. 2, the diffuser diameter $d_i$ will generally be approximately one-half the internal diameter $d_m$, and preferably greater than or equal to $0.45d_m$ and less than or equal to $0.60d$ (i.e., $0.45\,d_m \leq d_i \leq 0.60\,d_m$). Flow randomizers that are similar to the preferred embodiment 40 depicted in FIG. 2 and which adhere to these design guidelines will reduce or substantially eliminate the flow effects caused by the upstream turbine meter thereby allowing the downstream turbine assembly to accurately and independently measure the flow characteristics of the fluid.

Figure 2A:
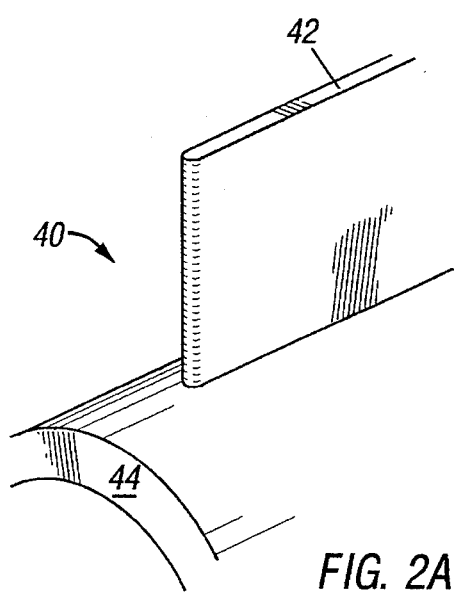
FIG. 2a illustrates a vane profile of the present invention.
Figure 2B:
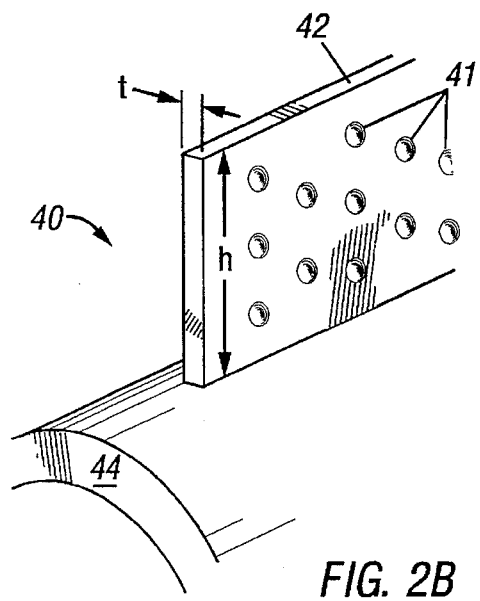
FIG. 2b illustrates a preferred vane profile of the present invention.

It has been found that the shape of the vanes 42 significantly affects the flow randomizing properties of the flow randomizer 40. For example, and as shown in FIGS. 2a and 2b, a smooth or tapered vane as illustrated in FIG. 2a actually degrades the flow randomizing properties of the flow randomizer 40 for a given length $L_v$. A preferred vane shape for the present invention is shown in FIG. 2b and is relatively blunt. It has been found that this type of vane design promotes an increase in the desired amount of small scale turbulence generated by flow the randomizer 40. It will be appreciated that other small scale turbulence increasing features may be added to flow randomizer 40. For example, dimples 41 similar to those found on conventional golf balls, or "pimples" in the nature of hemispheres or bumps, or turbulence enhancing spray coatings or surfaces may be placed on or applied to vanes 42 to increase the amount of small scale turbulence generated by the flow randomizer 40.

For flow randomizers similar to the preferred embodiment 40 depicted in FIGS. 2 and 2b, the ratio of randomizer vane length $L_v$ to vane thickness will typically be between 20 and 60 (i.e., $L_v/60 \leq t \leq L_v/20$), and preferably between 25 and 40 (i.e., $L_v/40 \leq t \leq L_v/25$). It should be understood that the flow randomizer of the present invention does not require that each vane 42 have the same vane thickness t. While the design criteria given above refer to a flow randomizer 40 having vanes 42 of substantially identical thickness t, it will be appreciated that a flow randomizer 40 having vanes 42 of differing thicknesses t, t', t", etc. may well impart additional flow randomizing characteristics to the flow randomizer 40.

Figure 3:
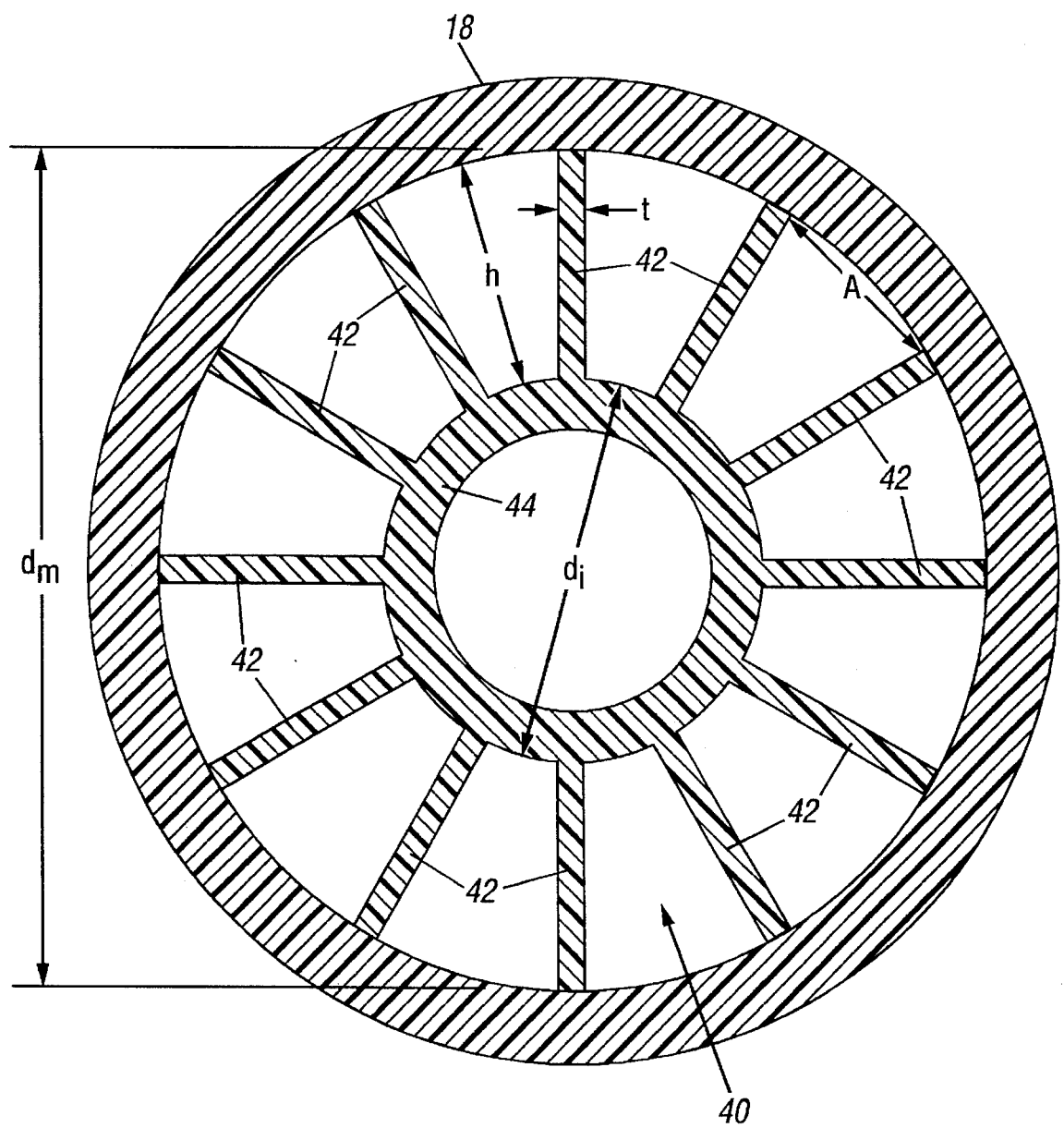
FIG. 3 illustrates a transverse cross-sectional view of a flow randomizer of the present invention.

FIG. 3 is a cross-sectional end view of the intermediate section 18 and a flow randomizer 40. FIG. 3 illustrates that the diameter $d_i$ of the central diffuser 44 is about half of the internal diameter of the meter $d_m$ (i.e., $d_i \approx d_m/2$).

As noted above, a preferred embodiment of the present invention has a diffuser diameter, $d_i$, between about $0.45d_m$ to $0.6d_m$. Typically, the ratio of the length of the flow randomizer $L_v$ (FIG. 2) to the maximum distance A between two consecutive vanes (FIG. 3) preferably should be between approximately 2 and 6 (i.e., $L_v/6 \leq A \leq L_v/2$). In a preferred embodiment of the present invention, the ratio of flow randomizer length $L_v$ to maximum distance A between two consecutive vanes is between 2.5 and 4.0 (i.e., $L_v/4.0 < A < L_v/2.5$). The height h of flow randomizer vanes 42 shown in FIG. 3 will be preferably between about $0.20d_m$ and $0.275d_m$ (i.e., $0.20d_m \leq h \leq 0.275d_m$).

The maximum flow through flow meter 10 is a function of the blockage caused the flow randomizer 40. The relationship between the angular velocity of vane assembly 24 or 32 (FIG. 1) and the volumetric flow rate of fluid 12 is not necessarily linear throughout the desired range of operation of the flow meter. Various factors known to those of ordinary skill in the art will affect the linearity of this relationship. It has been found for the present invention that the blockage caused by flow randomizer 40, including central diffuser 44, can be varied to adjust the linearity of the present invention. For example, increasing the blockage has been found to increase the low flow rate linearity of flow meters made in accordance with the present invention.

Figure 4:
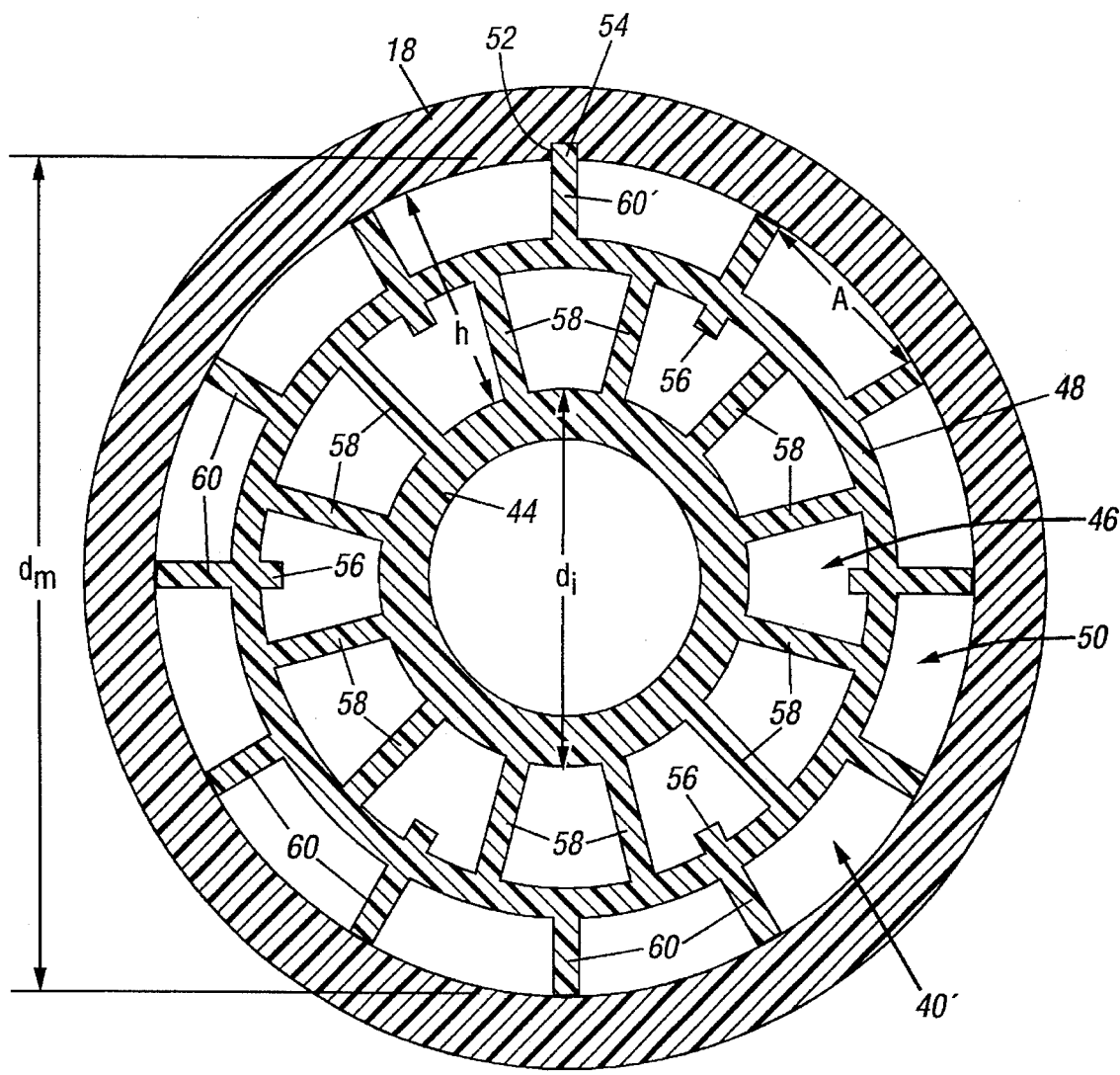
FIG. 4 illustrates a transverse cross-sectional view of a flow randomizer of the present invention.

In the alternate embodiment of FIG. 4, the flow randomizer 40' has a first region 46 of radial vanes 58 formed by the central diffuser 44 and a concentric tinge or annular divider 48. A second region of vanes 50 is formed by the annular divider 48 and the intermediate section 18. In this embodiment, the flow area (or volume) between adjacent vanes 58 in the first region 46 is substantially constant and the flow area (or volume) between adjacent vanes 60 in the second region 50 is also substantially constant. Moreover, in this embodiment, the total flow (or volume) area of the first region 46 is substantially the same as the total flow area (or volume) of the second region 50. It will be appreciated that the flow area (or volume) between adjacent vanes does not have to be constant, nor does the total flow area (or volume) between the first and second regions have to be substantially the same. These characteristics of the flow randomizer 40' can be adjusted to optimize the flow randomizing properties.

Also shown in FIG. 4 is a guide slot 52 that is integral with the intermediate section 18. Guide portion 54 of vane 60' engages guide slot 52 to position flow randomizer 40. Projections 56 are shown extending into the first vane region 46 to enhance the flow randomizer properties of flow randomizer 40. Projections 56 can also be used in the second region 50 if desired.

It has been found that manufacturing techniques such as casting (and particularly investment casting) are suitable for producing flow randomizers as illustrated and described in FIGS. 3 and 4. It will be appreciated that the surface morphology of the vanes can be controlled during the casting process to affect the amount of small scale turbulance generated by the flow randomizer.

Figure 5:
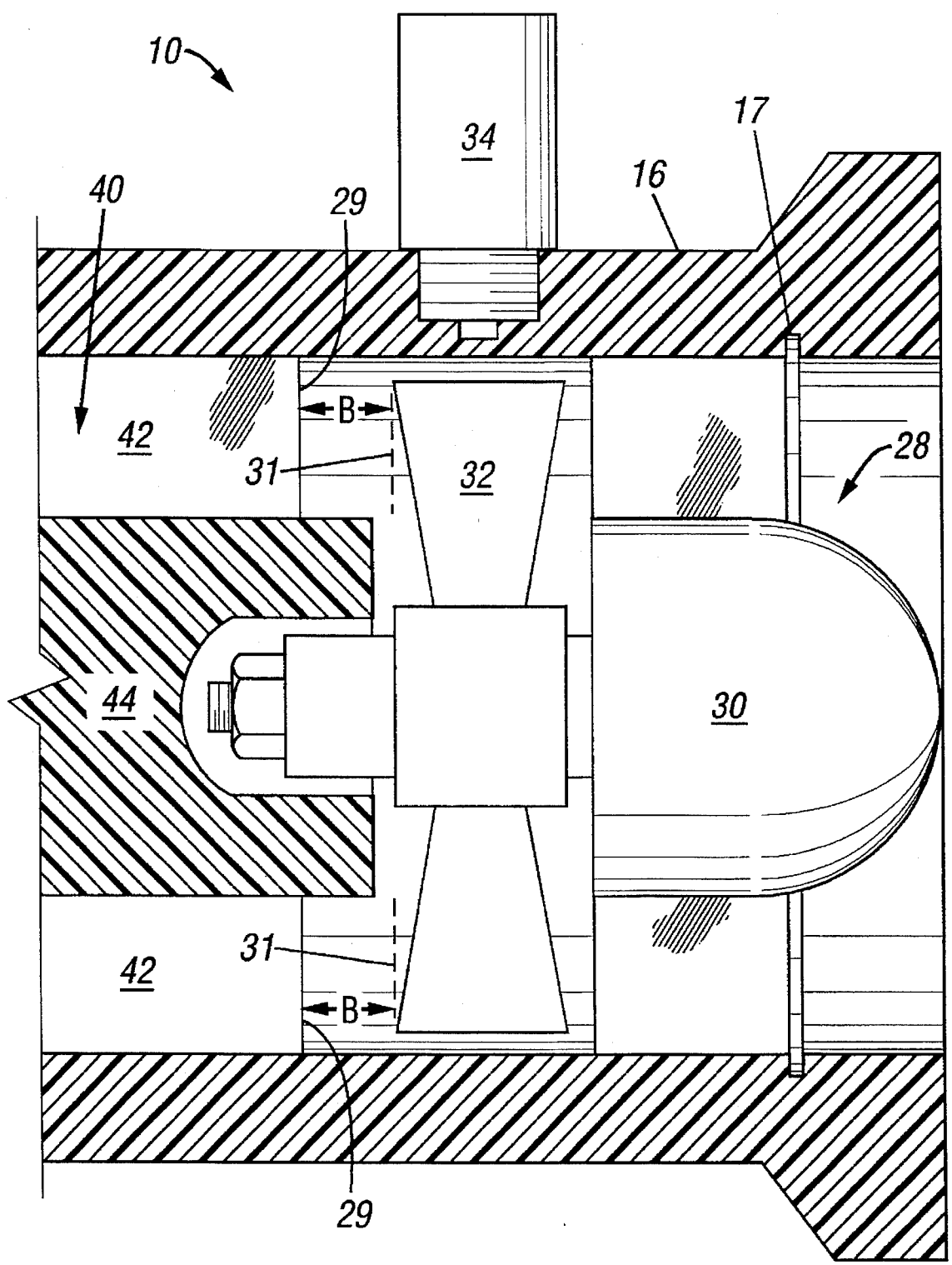
FIG. 5 illustrates a partial longitudinal cross-sectional view of a downstream turbine assembly and flow randomizer of the present invention.

FIG. 5 shows a preferred embodiment of the present invention and specifically focuses on the relationship between a preferred flow randomizer 40 and the downstream turbine assembly 28. Preferably, the physical spacing B between the exit plane 29 of the vanes 42 of the flow randomizer 40 and the plane 31 formed by the leading edge of the downstream rotor assembly 32 should be between 5 and 10 times the vane thickness t of the flow randomizer 40 (i.e., $5t \leq B \leq 10t$). For a bi-directional flow meter, these same relationships, should be used for the "upstream" turbine assembly as well.

The spacing B of the flow randomizer 40 to the turbine assembly 28 can be optimized by positioning the flow randomizer 40 such that wake flow characteristics caused by the flow randomizer 40 are minimized. For example, an optimum spacing B has been found to be distance at which the flow shear layers produced by any one vane converge. It will be appreciated that this distance varies as a function of flow velocity. As pointed out above, this spacing has been found to be between about 5t and 10t for the present invention.

The downstream vane assembly 30 (and the upstream vane assembly 22) may utilize similar vane thickness, vane height, and vane spacing design criteria of the flow randomizer 40 to thereby reduce the influence of the turbine assemblies on the flow.

It will be appreciated that there are various suitable techniques for positioning the flow randomizer 40 relative to the downstream rotor assembly 28 (and the upstream rotor assembly 20 for bi-directional capabilities). For example, in the preferred embodiment of FIG. 1, the flow randomizer 40 is positioned in the intermediate housing 18 relative to an end of the intermediate housing 18. The intermediate housing 18 and the upstream housing and the downstream housing 16 are fabricated such that coupling the three members together results in the proper spatial relationship between the turbine assemblies and the flow randomizer. Other suitable techniques may exist for assuring and maintaining the proper spatial relationship.

Meters made in accordance with the present invention are able to produce truly independent flow measurements from either the "downstream" turbine assembly or the "upstream" turbine assembly, regardless of the direction of fluid flow. Moreover, flow meters of the present invention are compact in size, generally have a length equal to or less than three times the nominal pipe diameter, and offer increased reliability of volumetric flow measurement because of the arrangement of the two independent turbine meters.

The foregoing disclosure is sufficient to enable one of ordinary skill in the art to practice the present invention. Further, the foregoing disclosure provides the best mode of practicing the present invention presently contemplated by the inventors. However, it will be appreciated by those of ordinary skill in the an having benefit of this disclosure that there are various modifications that may be made to the present invention without departing from the scope of the present invention.

What is claimed is:

1. A meter for measuring a volumetric flow of a fluid in a conduit, which comprises:

a pair of independent turbine assemblies, each of said turbine assemblies having a plurality of rotor blades and each adapted to have a speed of rotation representative of the volumetric fluid flow;

a flow randomizer located between said pair of turbine assemblies, said randomizer having at least a vane, said randomizer spaced from said rotor blades of one turbine assembly by a distance equal to between approximately 5 and approximately 10 times a thickness of said randomizer vane, and being operable to eliminate substantially all flow effects of one of said turbine assemblies upon said other turbine assembly; and a transducer for detecting said speed of rotation of at least one of said turbine assemblies.

2. The flow meter of claim 1, wherein said flow randomizer comprises a plurality of vanes emanating radially from a central diffuser.

3. The flow meter of claim 1, wherein said flow randomizer comprises a combination of concentric rings and a plurality of vanes.

4. The flow meter of claim 1, wherein a length of said flow meter is less than or equal to 3 times the nominal diameter of said conduit transporting said fluid.

5. The flow meter of claim 1, wherein said turbine assemblies are each cantilever turbine assemblies.

6. The flow meter of claim 1, wherein said transducer means is a magnetic inductance turbine pickup.

7. The flow meter of claim 6, further comprising two magnetic inductance turbine pickups for each turbine assembly electrically separated by about 90°.

8. The flow meter of claim 2, wherein said flow randomizer vanes have a thickness, t, that satisfies the relationship: $L_v/60 \leq t \leq L_v/20$, where $L_v$ is the average length of said randomizer vanes.

9. The flow meter of claim 2, wherein said flow randomizer vanes have a height, h, that satisfies the relationship: $0.20d_m \leq h \leq 0.275d_m$, where $d_m$ is the inside diameter of said flow meter.

10. The flow meter of claim 1, wherein said flow randomizer further comprises a plurality of vanes, and wherein said flow randomizer is spaced from a plane formed by leading edges of one of said turbine assemblies a distance substantially equal to a distance at which a flow shear layer produced by any one of said plurality of vanes converges.

11. The flow meter of claim 2, wherein said flow randomizer vanes have a length, $L_v$, that satisfies the relationship: $L_v \geq d_m/2$, where $d_m$ is the nominal inside diameter of said flow meter.

12. A volumetric fluid flow meter for measuring flow in a conduit, which comprises:

a first bi-directional, substantially non-magnetic, independent turbine assembly, said turbine assembly having a vane assembly and a turbine having a plurality of substantially magnetic rotors, said turbine adapted to freely rotate at speeds representative of differing rates of fluid flow past said first turbine assembly;

a second bi-directional, substantially non-magnetic, independent turbine assembly, said turbine assembly having a vane assembly and a turbine having a plurality of substantially magnetic rotors, said turbine adapted to freely rotate at speeds representative of differing rates of fluid flow past said second turbine assembly;

a flow randomizer located between said first bi-directional turbine assembly and said second bi-directional turbine assembly, said randomizer having a plurality of vanes of sufficient length to eliminate substantially all flow effects of one of said turbine assemblies upon the other turbine assembly;

a first magnetic pickup located adjacent said magnetic rotors of said first turbine assembly for transducing the speed of rotation of said first turbine;

a second magnetic pickup located adjacent said magnetic rotors of said second turbine assembly for transducing the speed of rotation of said second turbine; and wherein an overall length of said flow meter is equal to or less than 3 times an inside diameter of said flow meter.

13. The flow meter of claim 12, wherein said flow randomizer comprises a plurality of vanes emanating radially from a central diffuser.

14. A volumetric fluid flow meter which comprises:

a first independent cantilevered turbine assembly, said turbine assembly having a vane assembly and a turbine having a plurality of rotors, said turbine adapted to freely rotate at speeds representative of differing rates of fluid flow past said first turbine assembly;

a second independent cantilevered turbine assembly, said turbine assembly having a vane assembly and a turbine having a plurality of rotors, said turbine adapted to freely rotate at speeds representative of differing rates of fluid flow past said second turbine assembly;

a flow randomizer located between said first turbine assembly and said second turbine assembly, said randomizer having a plurality of vanes of sufficient length to eliminate substantially all flow effects of one of said turbine assemblies upon the other turbine assembly;

a first magnetic pickup located adjacent said magnetic rotors of said first turbine assembly for transducing the Speed of rotation of said first turbine; and a second magnetic pickup located adjacent said magnetic rotors of said second turbine assembly for transducing the speed of rotation of said second turbine; and wherein an overall length of said flow meter is equal to or less than 3 times an inside diameter of said flow meter.

15. The flow meter of claim 13, wherein said flow randomizer vanes have a thickness, t, that satisfies the relationship: $L_v/60 \leq t \leq L_v/20$, where $L_v$ is the average length of said randomizer vanes.

16. The flow meter of claim 13, wherein said flow randomizer vanes have a thickness, t, that satisfies the relationship: $L_v/40 \leq t \leq L_v/25$, where $L_v$ is the average length of said randomizer vanes.

17. The flow meter of claim 13, wherein said flow randomizer vanes have a height that is approximately one-half of a diameter of said central diffuser.

18. The flow meter of claim 13, wherein said flow randomizer vanes have a height, h, that satisfies the relationship: $0.20d_m \leq h \leq 0.275d_m$, where $d_m$ is the nominal inside diameter of said flow meter.

19. The flow meter of claim 14, wherein said flow randomizer is spaced from a plane formed by leading edges of one of said turbine assemblies by a distance of between approximately 5 and approximately 10 times an average randomizer vane thickness.

20. The flow meter of claim 12, wherein said flow randomizer is spaced from a plane formed by leading edges of one of said turbine a distance at which a flow shear layer produced by any one of said plurality of vanes converges for a predetermined fluid flow.

21. The flow meter of claim 14, wherein said flow randomizer is spaced from a plane formed by leading edges of one of said turbine assemblies a distance of about 6 to 8 times an average randomizer vane thickness.

22. The flow meter of claim 13, wherein said flow randomizer vanes have a length, $L_v$, that satisfies the relationship: $L_v \geq d_m/2$, where $d_m$ is the nominal inside diameter of said flow meter.

23. The flow meter of claim 13, wherein said flow randomizer vanes have a length, $L_v$, that satisfies the relationship: $3d_m/4 \leq L_v \leq d_m$, where $d_m$ is the nominal inside diameter of said flow meter.

24. A method of measuring the volumetric flow rate of a fluid in a conduit comprising the steps of:

flowing said fluid through a flow meter of a length approximately equal to or less than three times the nominal diameter of said conduit, said flow meter comprising a first independent turbine assembly and a second independent turbine assembly separated by a flow randomizer having at least one vane, said randomizer spaced from said first turbine assembly a distance equal to between approximately 5 and approximately 10 times a thickness of said vane;

decreasing flow effects in said fluid caused by said first turbine assembly;

measuring a speed of rotation of said first independent turbine assembly; and measuring a speed of rotation of said second independent turbine assembly.

25. The flow meter of claim 14, wherein dimples are formed on a surface of at least one of said plurality of vanes.

26. The flow meter of claim 14, wherein bumps are formed on a surface of at least one of said plurality of vanes.

27. A meter for measuring a volumetric flow of a fluid in a conduit, which comprises:

a first independent cantilever turbine assembly having a fixed end and a free end;

a second independent cantilever turbine assembly having a fixed end and a free end;

said first and second turbine assembly each having a plurality of rotor blades and each adapted to have a speed of rotation representative of the volumetric fluid flow; and a flow randomizer intermediate said first and second turbine assembly, said randomizer having a first end and a second end and at least one vane, said first end of said randomizer adapted to shroud at least a portion of said free end of said first turbine assembly; said second end of said randomizer adapted to shroud at least a portion of said free end of said second turbine assembly, said flow randomizer vane spaced from said rotor blades of said first and second turbine assembly by a predetermined distance.

28. A meter for measuring a volumetric flow of a fluid in a conduit, which comprises:

a first independent turbine assembly;

a second independent turbine assembly;

said first and second turbine assembly each having a plurality of rotor blades and each adapted to freely rotate at a speed representative of the volumetric fluid flow;

a flow randomizer intermediate said first and second turbine assembly, said flow randomizer spaced from said rotor blades of said first turbine assembly a distance substantially equal to a distance at which a flow shear layer caused by said randomizer converges for a predetermined fluid flow.

29. A volumetric fluid flow meter, which comprises:

a first bi-directional, substantially non-magnetic turbine assembly, said turbine assembly having a vane assembly and a turbine having a plurality of substantially magnetic rotors, said turbine adapted to rotate at speeds representative of differing rates of fluid flow past said first turbine assembly;

a second bi-directional, substantially non-magnetic turbine assembly, said turbine assembly having a vane assembly and a turbine having a plurality of substantially magnetic rotors, said turbine adapted to rotate at speeds representative of differing rates of fluid flow past said second turbine assembly;

a flow randomizer located between said first bi-directional turbine assembly and said second bi-directional turbine assembly, said randomizer having a plurality of vanes emanating radially from a central diffuser of sufficient length to eliminate substantially all flow effects of one of said turbine assemblies upon the other turbine assembly, said randomizer spaced from a plane formed by leading edges of one of said turbine assemblies a distance of about 6 to 8 times an average randomizer vane thickness;

a first magnetic pickup located adjacent said magnetic rotors of said first turbine assembly for transducing the speed of rotation of said first turbine; and a second magnetic pickup located adjacent said magnetic rotors of said second turbine assembly for transducing the speed of rotation of said second turbine.

* * * * *